United States Patent [19]
Heintz et al.

[11] Patent Number: 5,855,488
[45] Date of Patent: Jan. 5, 1999

[54] PROTECTION LAMP SAFETY INTERCONNECT APPARATUS AND METHOD

[75] Inventors: Brian G. Heintz, Canby; Henry Frazier Pruett, Sandy, both of Oreg.

[73] Assignee: In Focus Systems, Inc., Wilsonville, Oreg.

[21] Appl. No.: 934,484

[22] Filed: Sep. 19, 1997

[51] Int. Cl.$^6$ .................................................. H01R 13/62
[52] U.S. Cl. .......................... 439/310; 439/342; 439/226; 353/119
[58] Field of Search .................................... 353/119, 122; 439/310, 157, 297, 342, 347, 911, 226

[56] References Cited

U.S. PATENT DOCUMENTS

| | | | |
|---|---|---|---|
| 4,387,951 | 6/1983 | Hall et al. | 439/297 X |
| 4,470,100 | 9/1984 | Rebaudo et al. | 439/310 X |
| 5,205,753 | 4/1993 | Butterfield et al. | 439/157 |
| 5,347,324 | 9/1994 | Sasaki et al. | 353/119 |
| 5,676,442 | 10/1997 | Fujimori | 353/119 |

*Primary Examiner*—Khiem Nguyen
*Attorney, Agent, or Firm*—Stoel Rives LLP

[57] ABSTRACT

A removable lamp module (14) employs a male (26) and female (22) electrical connector (24) pair that serves multiple functions including connecting a lamp power supply (72) and high-voltage lamp igniter circuit (74) to an arc lamp (39), acting as a safety interlock switch, and mechanically latching the lamp module within a projector cavity (13). The lamp module safely encloses the arc lamp, provides an airflow pathway for cooling the arc lamp, and slidably secures (50) the male half of the connector pair. The lamp module slides in a first direction into the cavity, and the male half of the connector pair slides in a second direction, transverse to the first direction, into engagement with the female half of the connector pair to latch the lamp module within the projector cavity. Replacing the arc lamp entails sliding the connector pair out of engagement, removing the lamp module from a projector enclosure (12), and replacing the lamp. Disengaging the connector pair mechanically unlatches the lamp module from the projector enclosure and concurrently opens a safety interlock circuit that electrically disconnects power from the lamp power supply and the lamp igniter circuit, and electrically disconnects the arc lamp from the lamp power supply and the lamp igniter circuit.

13 Claims, 5 Drawing Sheets

PROTECTION LAMP SAFETY INTERCONNECT APPARATUS AND METHOD

RELATED APPLICATIONS

Not Applicable

FEDERALLY SPONSORED RESEARCH OR DEVELOPMENT

Not Applicable

TECHNICAL FIELD

This invention relates to safety interlock devices and more particularly to an electromechanical interlock connector for supplying power to an arc lamp module and concurrently securing the arc lamp module within an image projector.

BACKGROUND OF THE INVENTION

There are previously known safety interlocking systems for protecting electrical equipment users and technicians against hazards, such as electrical shock, burns, radiation, and improper operating modes.

For example, it is well known to enclose a hazardous apparatus in a protective cage having an access door or panel, the removal of which actuates a safety interlock switch. Such a safety interlock switch typically removes primary power from the electrical equipment and must, therefore, be rated to carry primary currents and voltages.

In another example, some electrical equipment include a module that is removable for servicing or replacement. Often the removable module is secured behind or attached to an access panel. Typically, such removable modules are secured within the electrical equipment by mechanical fasteners and have separate electrical interconnections, safety interlock switches, and related wiring harnesses.

Portable image projectors present an interesting mix of requirements and hazards. Many such projectors employ a metal-halide arc lamp that operates at a very high temperature, requires a high voltage pulse to ignite the arc, must be readily replaceable, must be compact and lightweight, and must be packaged to protect users and the projector from heat, high voltage, and improper operating modes, such as operation of equipment at excessive temperatures, and high-voltage pulse generation during arc lamp replacement.

Portable image projectors are generally referred to as being "ultra-portable" if they are small enough and light enough to be carried by one hand. However, the above-described arc lamp hazards and requirements generally contribute to making the arc lamp-related apparatus among the bulkiest and heaviest of those used in portable image projectors, rendering them undesirable for use in ultra-portable projectors.

What is needed, therefore, is a compact, lightweight, and safe arc lamp apparatus that is suitable for use in portable and ultra-portable image projectors.

SUMMARY OF THE INVENTION

An object of this invention is, therefore, to provide a lamp apparatus that is suitable for use in portable and ultra-portable image projectors.

Another object of this invention is to provide a replaceable arc lamp module having a unitary electrical and mechanical safety interlock apparatus.

A further object of this invention is to provide a method for safely replacing an arc lamp in an image projector.

A removable lamp module of this invention employs a male and female electrical connector pair that serves multiple functions including connecting power and high-voltage ignition pulses to the lamp, acting as a safety interlock switch, and mechanically latching the lamp module within a projector enclosure. The lamp module safely encloses a hazardous metal halide arc lamp, provides an airflow pathway for cooling the arc lamp, and slidably secures the male half of the connector pair. The lamp module slides in a first direction into the projector enclosure, and the male half of the connector pair slides in a second direction, transverse to the first direction, into engagement with the female half of the connector pair to latch the lamp module within the projector enclosure.

Replacing an arc lamp entails sliding the connector pair out of engagement, removing the lamp module from the projector enclosure, and replacing the lamp. Disengaging the connector pair mechanically unlatches the lamp module from the projector enclosure and concurrently opens a safety interlock circuit that electrically disconnects power from a lamp power supply and a lamp igniter circuit, and electrically disconnects the arc lamp from the lamp power supply and the lamp igniter circuit.

An advantage of this invention is that when the connector halves are engaged, the lamp module is mechanically secured within the projector enclosure, thereby protecting users from excessive temperatures, bulb explosions, and electrical shocks.

Another advantage of this invention is that when the connector halves are disengaged, power is removed from the lamp power supply and the lamp igniter circuit, thereby preventing users from receiving electrical shocks.

Yet another advantage of this invention is that the connector halves form a safety interlock circuit that "fails" in a safe, open-circuit condition.

A further advantage of this invention is that it eliminates multiple separate components normally employed to implement electrical interconnect, safety interlock, and mechanical latching functions, thereby providing a simpler, lighter weight, and less costly lamp module.

Additional objects and advantages of this invention will be apparent from the following detailed description of a preferred embodiment thereof that proceeds with reference to the accompanying drawings.

DETAILED DESCRIPTION OF A PREFERRED EMBODIMENT

Figure 1:
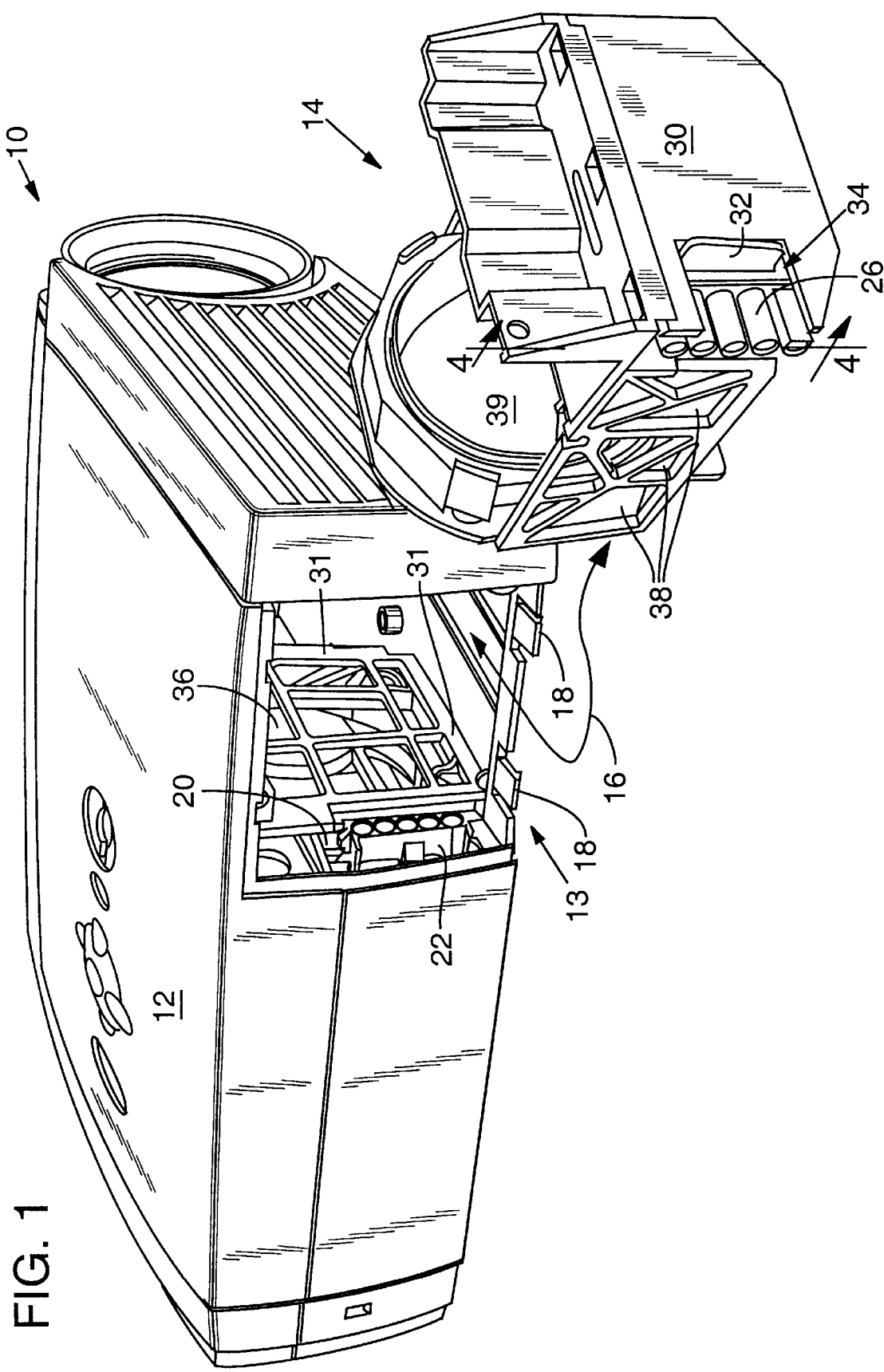
FIG. 1 is an isometric view of an image projector enclosure showing a lamp module removed from the projector enclosure to reveal a safety interlocking lamp connector of this invention.

FIG. 1 shows an image projector 10 (hereafter "projector 10") housed in an enclosure 12 having a cavity 13, into which a lamp module 14 may be slidably removed or inserted along a directional path generally indicated by an arrow 16. When fully inserted into cavity 13, lamp module 14 is covered by an access panel (not shown) that snaps into place and is secured to enclosure 12 by a pair of cantilever snap latches 18.

Cavity 13 is sized to mate with lamp module 14, thereby properly aligning and positioning lamp module 14 as it slides into or out of cavity 13. Projector 10 includes adjacent to cavity 13 a side wall 20, to which is fixedly mounted a female half 22 of a mating five-pin connector pair 24 (FIG. 5) (hereafter "connector 24"), whereas lamp module 14 includes an outer shell 30, within which is slidably mounted a male half 26 of connector 24. Easy user assess to male half 26 of connector 24 is ensured by mounting it on or adjacent to outer shell 30 of lamp module 14. Lamp module 14 slides into enclosure 12 along a first direction defined by cavity 13, whereas female and male halves 22 and 26 of connector 24 slidably engage together in a second direction that is preferably transverse to the first direction. Female and male halves 22 and 26 of connector 24 are preferably respective part Nos. 350810-1 and 350809-1 manufactured by AMP, Inc., Harrisburg, Pa.

Figure 2A:
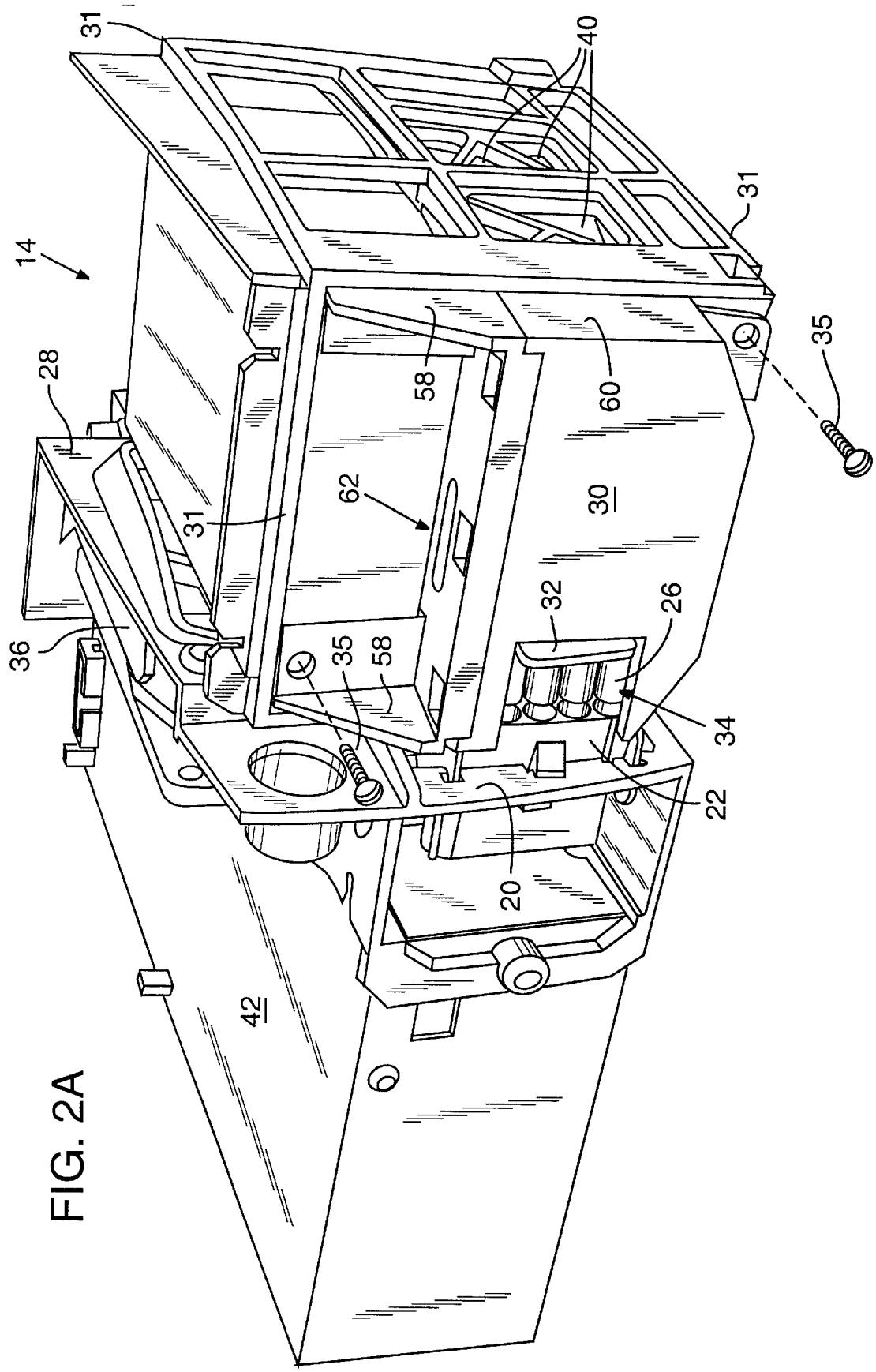
FIGS. 2A and 2B are isometric views of internal components of the image projector of FIG. 1 showing the lamp module operatively positioned in the projector within a lamp frame mounted adjacent to a power supply and a cooling fan, and further showing the safety interlocking lamp connector in respective disengaged and engaged positions.
Figure 2B:
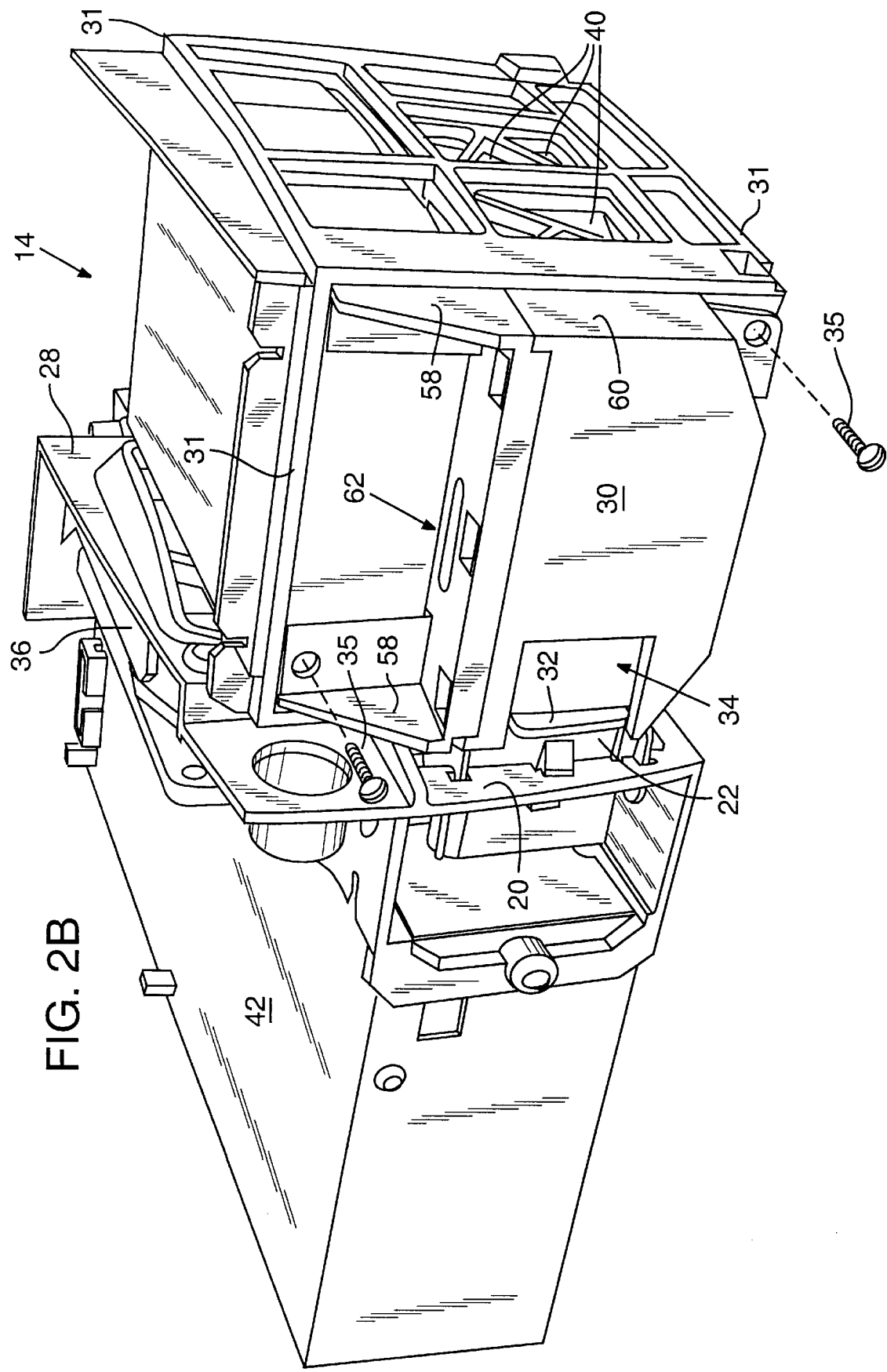

FIGS. 2A and 2B show lamp module inserted into a lamp frame 31 that defines the boundaries of cavity 13, and further show that when engaged together in the second direction, connector 24 performs a mechanical latching function that prevents lamp module 14 from sliding in the first direction out of lamp frame 31. A slider handle 32 slides in an opening 34 formed in outer shell 30 of lamp module 14. Slider handle 32 is mechanically coupled to male half 26 of connector 24 to enable a user to engage and disengage male half 26 and female half 22. FIG. 2A shows slider handle 32 in its rightmost position, which disengages connector 24, whereas FIG. 2B shows slider handle 32 in its leftmost position, which engages connector 24 and mechanically latches lamp module 14 in lamp frame 31. Lamp module 14 is preferably secured within lamp frame 31 by a pair of screws 35.

FIGS. 1, 2A, and 2B further show a cooling fan 36 mounted on an opening in and from the opposite surface of side wall 20 to direct airflow toward air inlets 38 on lamp module 14. Air flows generally in the second direction through lamp module 14, across an arc lamp 39, and exhausts through air outlets 40. Also mounted adjacent to the opposite surface of side wall 20 is a housing 42 enclosing electrical components that are described with reference to FIG. 5.

Figure 3:
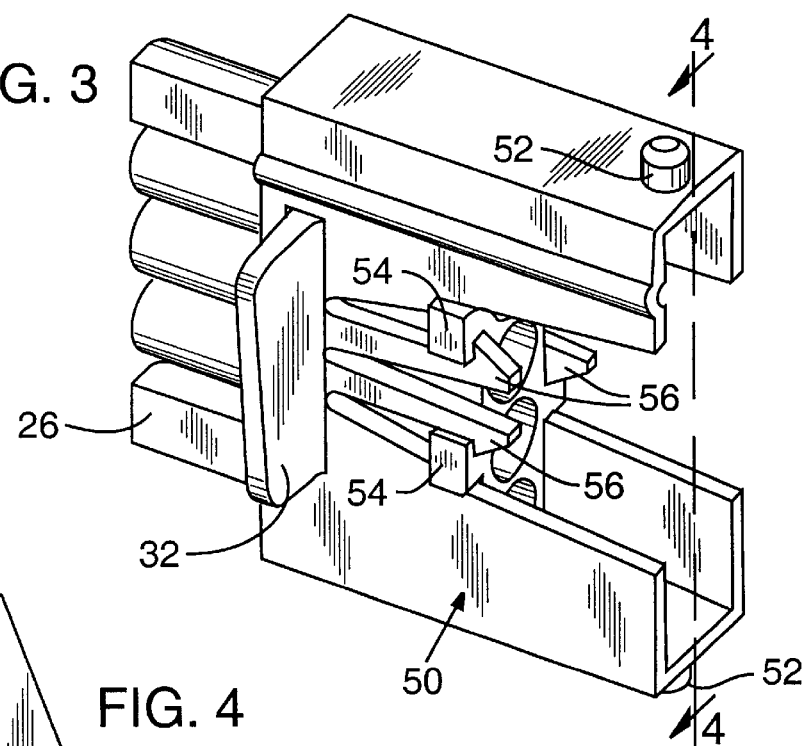
FIG. 3 is an enlarged isometric view of the safety interlocking lamp connector of FIGS. 1 and 2 shown removed from the lamp module and inserted into a slider assembly of this invention.

FIG. 3 shows connector 24 male half 26 mounted within a slider assembly 50, on which slider handle 32 and an outwardly extending pair of guide posts 52 are attached. Male half 26 includes a set of laterally extending mounting posts 54, and slider assembly 50 includes an associated set of pliable ratchet tabs 56 that latch behind mounting posts 54 when male half 26 is inserted into slider assembly 50.

Figure 4:
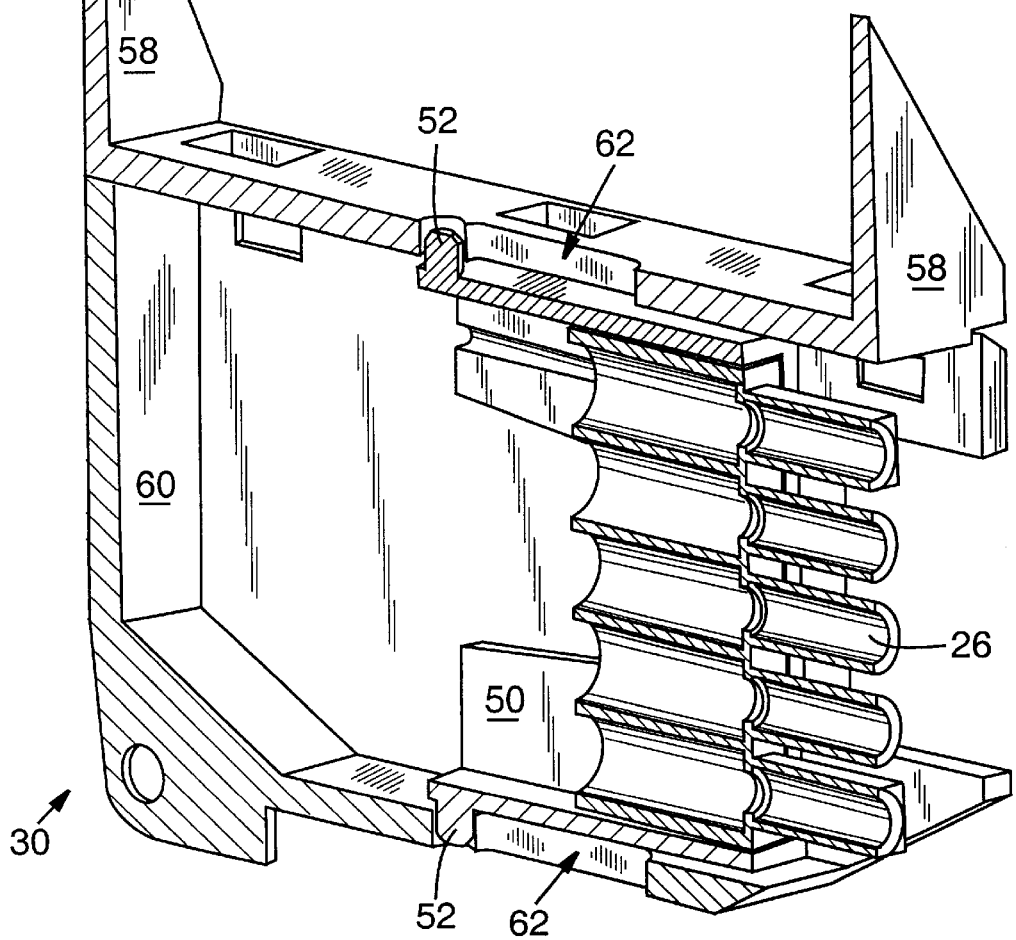
FIG. 4 is an enlarged cross-sectional isometric view taken along lines 4—4 of FIGS. 1 and 3 and showing the safety interlocking lamp connector and slider assembly mounted within an outer shell of the lamp module.

FIG. 4 shows the reverse side of male half 26 and slider assembly 50 cross-sectionally cut away to reveal how they slidably mount within outer shell 30. Shell 30 comprises an upper portion 58 that is attached by screws (not shown) to a lower portion 60. Upper and lower portions 58 and 60 include slots 62 that slidably receive guide posts 52 of slider assembly 50. Slider assembly 50 is installed in outer shell 30 by separating its upper and lower portions 58 and 60, lowering slider assembly 50 into lower portion 60 such that guide post 52 engages one of slots 62; and fastening upper portion 58 to lower portion 60. When assembled, male half 26 and slider assembly 50 slide together within outer shell 30 by a distance defined by the lengths of slots 62.

Figure 5:
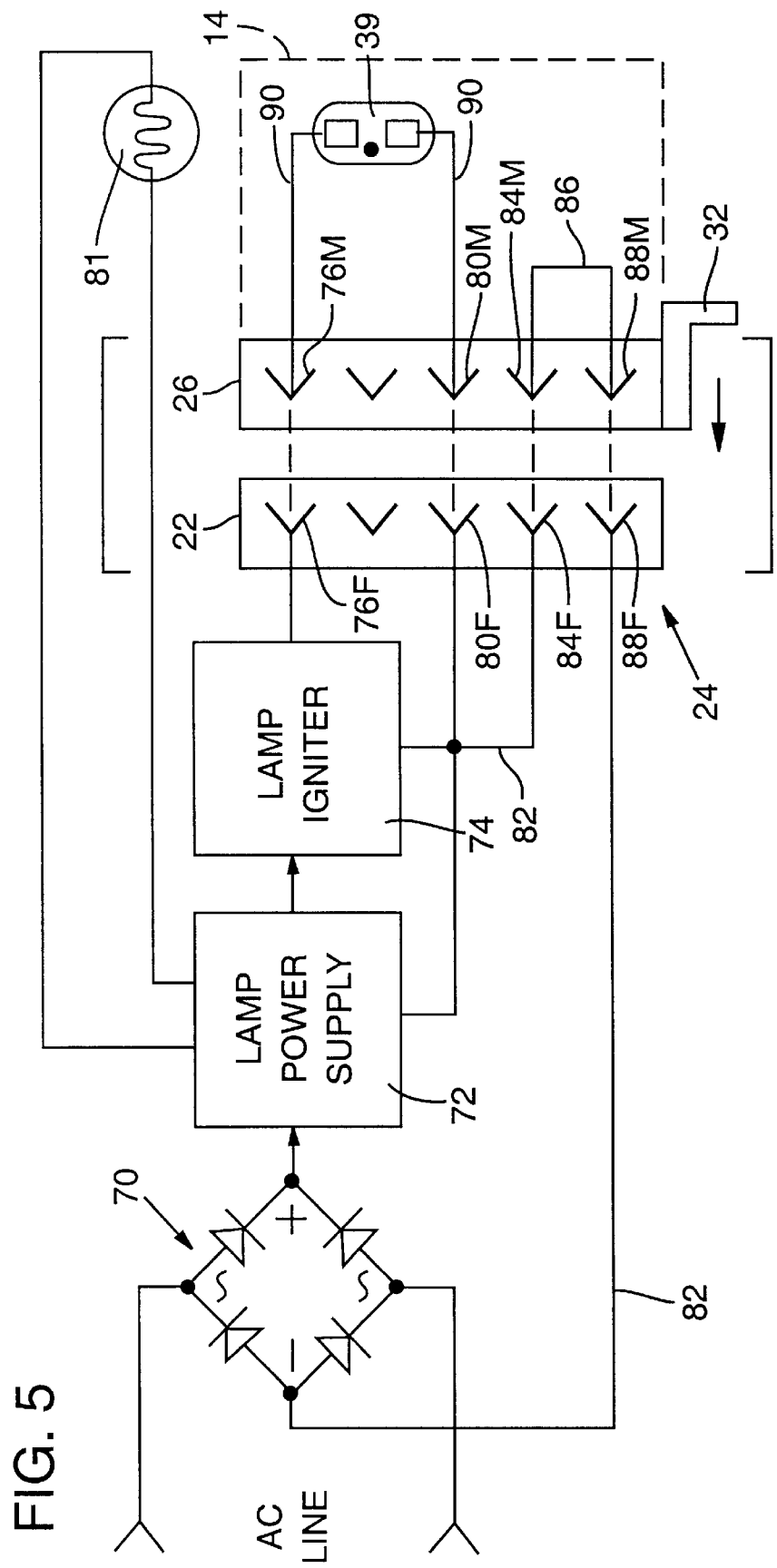
FIG. 5 is an electrical schematic diagram showing a preferred embodiment of a safety interlocking lamp interconnect circuit of this invention.

FIG. 5 shows how connector 24 also performs electrical interconnect and safety interlock functions for projector 10. A bridge rectifier 70 receives alternating current line power and provides positive direct current ("DC") voltage to a lamp power supply 72, which generates a ballasted 30 to 50 volts DC lamp voltage that is looped through a lamp igniter circuit 74 and electrically connected to a contact 76F ("F" indicates female) in female half 22 of connector 24. A contact 76M ("M" indicates male) in male half 26 of connector 24 mates to contact 76F and is electrically connected to arc lamp 39 that is mounted within lamp module 14. Arc lamp 39 is preferably a 270-watt, metal-halide arc lamp, although arc lamps dissipating less than about 300 watts are suitable for use in portable projectors. The circuit from arc lamp 39 is completed to lamp power supply 72 and lamp igniter circuit 74 through a mating pair of contacts 80F and 80M in connector 24. A thermal sensor or circuit breaker 81 deactivates lamp power supply 72 if the temperature adjacent to lamp module 14 exceeds a predetermined limit.

Lamp igniter circuit 74 generates greater than 10,000 volt pulses, preferably 20,000 volts pulses, during the ignition of arc lamp 39. Therefore, connector 24 must be insulated to withstand the voltage required to ignite arc lamp 39 and also be rated to carry the 30 to 50 volts DC at about 9 amperes required to power arc lamp 39 after it is ignited. The preferred connector (described above) is of a coaxial pin housing type that fully encloses the male and female pins inserted into female and male halves 22 and 26 and does, therefore, meet the above-stated insulation and rating requirements.

The safety interlock function of connector 24 is performed by electrically connecting a power return conductor 82 from lamp power supply 72 and lamp igniter circuit 74, through a mating pair of contacts 84F and 84M, through a jumper conductor 86, and through a mating pair of contacts 88F and 88M to bridge rectifier 70. When slider handle 32 disengages connector halves 22 and 26, power return conductor 82 is opened, disconnecting bridge rectifier 70 from lamp power supply 72 and lamp igniter circuit 74 and, thereby, shutting down projector 10. The primary failure mode for any of mating contact pairs 84, and 88 is to fail in an open circuit condition, which is a fail-safe condition that also actuates the safety interlock function of this invention.

While not shown in FIGS. 3 and 4, mating contact pairs 76, 80, 84, and 88 comprise insertable female and male contacts that slide into and lock in place within the cylindrical openings formed in respective female and male halves 22 and 26 of connector 24. Arc lamp 39 is preferably part of a prewired assembly including a 15 pair of high-voltage insulated wires 90 interconnecting arc lamp 39 and contacts 76M and 80M, which are inserted in male connector half 26; and jumper conductor 86 interconnecting contacts 84M and 88M, which are also inserted in male connector half 26.

Removing arc lamp 39 from projector 10 entails removing the power cord (not shown) from projector 10, ensuring that lamp module 14 is sufficiently cool to handle, removing the lamp module access cover from projector 10, moving slider handle 32 to the right as shown in FIG. 2A, sliding lamp module 14 out of cavity 13, pinching together pliable ratchet tabs 56, sliding male connector half 26 out of slider assembly 50, and lifting arc lamp 39 and its prewired assembly out of lamp module 14.

Installing a replacement arc lamp 39 in projector 10 entails installing arc lamp 39 and its prewired assembly in lamp module 14, sliding male connector half 26 into slider assembly 50 until pliable ratchet tabs 56 lock into place behind mounting posts 54, sliding lamp module 14 into cavity 13, moving slider handle 32 30 to the left as shown in FIG. 2B, installing the lamp module access cover on projector 10, and reinserting the power cord in projector 10.

Skilled workers will recognize that portions of this invention can be implemented differently from the implementation described above for a preferred embodiment. For example, the safety interlock of this invention may be applied to virtually any electrical apparatus requiring a removable module enclosing an electrical load. In image projector applications, the lamp may be an incandescent lamp, in which case the insulation requirements of the connector are relaxed. Of course, lamps of higher or lower power levels than the one described can be employed, the female and male contacts can be positionally swapped or intermixed, and fewer or more contacts can be employed. Furthermore, the slider assembly can be applied to the projector, the fixed connector half can be mounted on the replaceable module, and the connector sliding direction can be changed to any angle that will still effect the mechanical latching function.

It will be obvious to those having skill in the art that many changes can be made to the details of the above-described embodiment of this invention without departing from the underlying principles thereof. Accordingly, it will be appreciated that this invention is also applicable to safety interlock applications other than those found in image projectors. The scope of the present invention should, therefore, be determined only by the following claims.

We claim:

1. A safety interlock apparatus for an image projector that includes a power supply and a lamp, comprising:

a frame defining a cavity within the image projector;

a removable module enclosing the lamp and slidable in a first direction in the cavity;

a first half of a mating connector pair mechanically coupled to the image projector; and a second half of the mating connector pair mechanically coupled to the removable module, at least one of the first and second connector halves slidable in a second direction substantially transverse to the first direction to concurrently engage the connector pair, mechanically latch the module within the frame, and electrically connect the power supply to the lamp.

2. The apparatus of claim 1 in which at least one of the first and second connector halves are slidable in the second direction to concurrently disengage the connector pair, mechanically unlatch the module within the frame, and electrically disconnect the power supply from the lamp.

3. The apparatus of claim 1 in which the image projector further includes a power source and the second half of the mating connector pair further includes a jumper conductor that electrically connects the power source to the power supply when the mating connector pair is engaged.

4. The apparatus of claim 1 in which the lamp is an arc lamp requiring a high-voltage ignition pulse.

5. The apparatus of claim 4 in which the mating connector pair has a current rating of at least about 9 amperes and a voltage insulation rating of at least about 10,000 volts.

6. The apparatus of claim 1 in which at least one of the first and second connector halves is captured within a slider assembly that is movable by a slider handle to engage and disengage the mating connector pair.

7. The apparatus of claim 6 in which the removable module includes an outer shell, and the slider assembly is slidably captured by the outer shell.

8. The apparatus of claim 7 in which the slider assembly includes guide posts and the outer shell includes substantially parallel slots that receive the guide posts to render the slider assembly slidable in the outer shell of the removable module.

9. A method for safely replacing a lamp in an image projector, comprising:

providing a power supply and a frame defining a cavity within the image projector;

enclosing the lamp in a removable module that is slidable in first directions into and out of the cavity;

coupling mechanically a first half of a mating connector pair to the image projector and a second half of the mating connector pair to the removable module, at least one of the first and second connector halves slidable in second directions substantially transverse to the first directions to respectively engage and disengage the connector pair, mechanically latch and unlatch the module within the frame, and electrically connect and disconnect the power supply and the lamp;

disengaging the mating connector pair;

sliding the removable module out of the cavity; and removing the lamp from the removable module.

10. The method of claim 9 further comprising replacing the lamp in the removable module, sliding the removable module into the cavity, and engaging the mating connector pair.

11. The method of claim 9 in which the coupling step further includes capturing at least one of the first and second connector halves within a slider assembly that is movable by a slider handle to engage and disengage the mating connector pair.

12. The method of claim 11 in which the removable module includes an outer shell, and the method includes capturing the slider assembly in the outer shell.

13. The method of claim 12 in which the slider assembly includes guide posts, the outer shell includes substantially parallel slots, and the method further includes installing the guide posts into the slots to render the slider assembly slidable in the outer shell of the removable module.

* * * * *